July 24, 1951 D. B. ARDERN 2,561,771
PROCESSES EMPLOYING FLUENT SOLIDS
Filed May 21, 1949
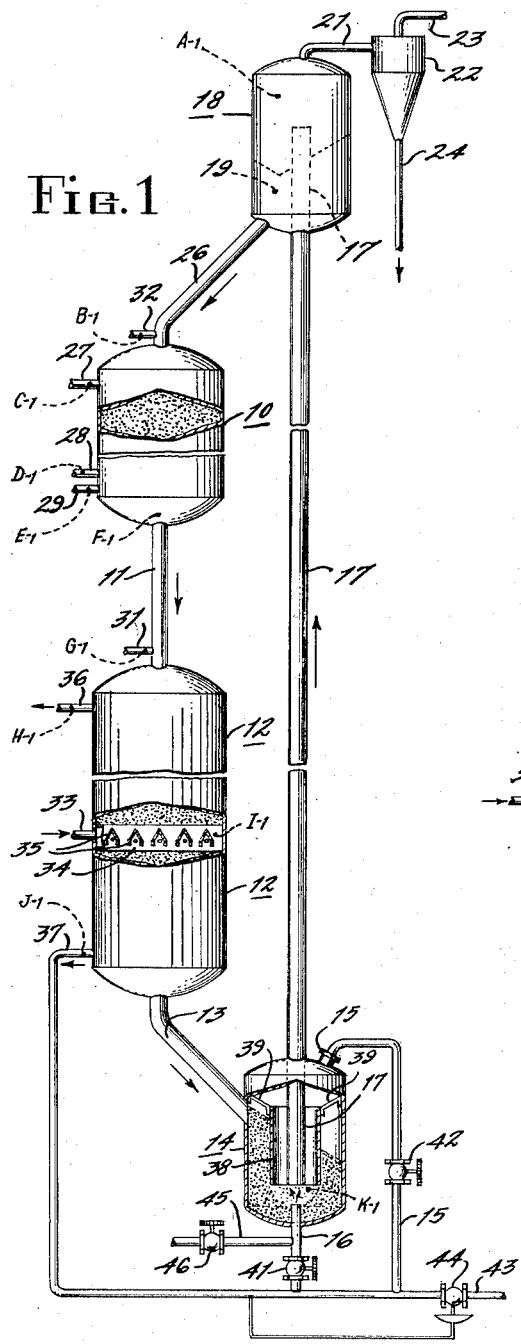
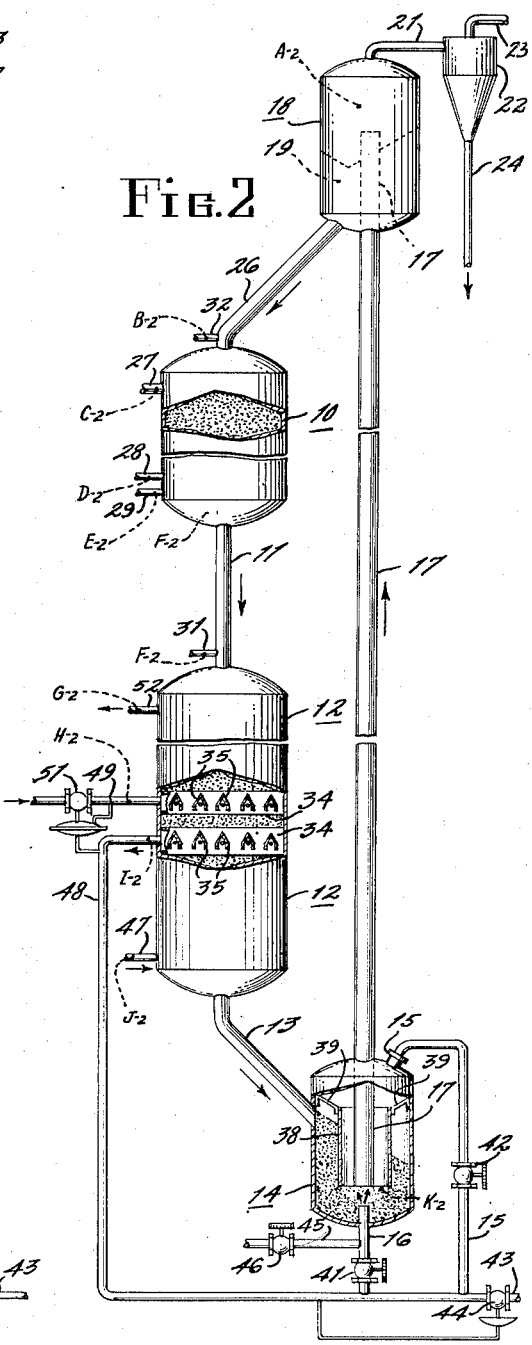
INVENTOR
David B. Ardern
BY
J. W. Rose
AGENT Patented July 24, 1951

2,561,771

UNITED STATES PATENT OFFICE 2,561,771

PROCESSES EMPLOYING FLUENT SOLIDS

David B. Ardern, Moylan, Pa., assignor to Houdry Process Corporation, Wilmington, Del., a corporation of Delaware Application May 21, 1949, Serial No. 94,674

6 Claims. (Cl. 196—52)

This invention relates to continuous hydrocarbon conversion processes, such as cracking, reforming, dehydrogenation, aromatization and the like, of the type in which a refractory solid hydrocarbon conversion catalyst contacts hydrocarbons under conversion conditions and thereby concomitantly accumulates a deposit of coke; the coked catalyst being thereafter contacted with oxygen containing gas under combustion conditions so as to remove at least a portion of said coke and thereby regenerate or reactivate the catalyst for further use, the solid catalyst employed in such processes having been prepared in such a form and handled in such a manner as to be fluent or capable of flowing. When the solid catalyst is in the form of relatively large particles or granules, such as particles ranging in size between 0.5 and 0.05 of an inch, a technique using downwardly moving non-turbulent compact beds of particles has been successful whereas, when the solid catalyst is in the form of relatively small particles such as particles between 100 and 400 mesh, it is handled by techniques known as fluidization and light phase suspension.

The present invention involves the former technique of flowing relatively large particles or granules, such as sized particles, pellets, formed spheres and the like of the size referred to above, downwardly in non-turbulent flow principally or solely by the influence of gravity. The gravitational flow of solids through process zones as compact downwardly moving non-turbulent beds is discussed generally in "The 'T. C. C.' cracking process for motor gasoline production" by R. H. Newton, G. S. Dunham and T. P. Simpson, "Transactions of the American Institute of Chemical Engineers," volume 41, page 215, April 25, 1945, and the articles there cited. The fluent particulate solid should preferably be sized so that the particles as a mass are capable of downward flow in compact form due principally or solely to the action of gravity (for example, in a seal leg) while gas is passed countercurrently through the mass at a pressure drop in the range of about 4 to about 8 inches of water per foot of mass depth for the gas involved without lifting the particles.

In the compact non-turbulent bed type of system, it has been found advantageous to transport the fluent particulate solid (i. e., catalyst) by one or more gas lifts of the type described herein in order to effect circulation of such particles through a system comprising at least one upflow path and at least one downflow path in which there are one or more reaction or process zones (i. e., a conversion or regeneration zone or both) wherein said solid contacts a reactive or process gas (i. e., hydrocarbons in the conversion zone and oxygen containing gas in the regeneration zone). In a hydrocarbon conversion system of the type described more fully below, the process zones are preferably at different heights in a single downflow path so that the solid particles need be transported by the gas lift only once in a complete cycle of operation although a plurality of gas lifts and of downflow paths may be employed. An exemplary system of this type has been described in an article entitled "Houdriflow: new design in catalytic cracking," appearing, inter alia, in the "Oil and Gas Journal," page 78, January 13, 1949.

In such systems, when the solid particles, after disengagement from the transporting gas, are thereafter moved downwardly in compact non-turbulent flow, the rate of transportation and circulation through the system is easily controlled, at least partially, by controlling the operation of the gas lift. Since the rate of circulation of catalyst will, at constant oil throughput, determine the catalyst to oil ratio and the rate of transfer of heat from the regeneration zone to the conversion zone, it will be easily appreciated that the manner of operation of the gas lift is an important phase of the process as a whole and that it is important to provide an adequate source of lifting gas under substantially constant conditions as economically as possible. This is done advantageously in accordance with the present invention.

As set forth in the article referred to immediately above and in my copending application, Serial No. 29,008, filed May 25, 1948 (of which application, the instant application is a continuation-in-part), a hydrocarbon conversion system comprising a gas lift may advantageously employ for the regeneration of the coked catalyst a series of vertically superimposed adjacent regeneration zones.

When such a system is operated by flowing separate streams of oxygen containing gas through the uppermost and the lowermost of said series of regeneration zones, the flue gas discharged from the uppermost regeneration zone is relatively wet due to the preferential combustion of the hydrogen content of the coke deposit while the flue gas discharged from the lowermost zone is relatively dry, as discussed more fully below. In accordance with the present invention, at least a part of the relatively dry flue gas from the lowermost regeneration zone is advantageously employed as at least the major source of the lifting gas used for elevating the catalyst.

The relatively dry flue gas from the lowermost regeneration zone may be discharged hot, (i. e., at about the temperature of regeneration and therefore in the approximate range of 900° to 1100° F. or more) and used as all or a major part of the lifting gas without intermediate cooling. Use of such gas saves the cost of heating gas to be used for lifting the catalyst. The series of regeneration zones may be preferably operated, in accordance with one aspect of the invention, so that the flue gas from the lowermost zone is at the highest temperature within the entire series of regeneration zones. In such an operation, use of the flue gas from the lowermost zone is more efficient thermally than is the use of flue gas from other regeneration zones, since these gases are cooler than the flue gas from the lowermost zone. By the use of high temperature flue gas, the catalyst is delivered to the top of the lift at a high temperature and heat losses are minimized, thus transferring a large amount of heat from the regeneration operation to the reaction zone and achieving a high temperature in the reaction zone.

As stated above, the oxygen containing gas flows through the uppermost and lowermost regeneration zones as two separate streams. In accordance with the present invention, the pressure, at the point of introduction, of at least the stream flowing through the lowermost zone is substantially above, such as from about 1 to 6 pounds per square inch, the pressure at the bottom of the lifting zone. The flow conditions of the oxygen containing gas through the bed of catalyst in the lowermost zone are selected so that the consequent pressure drop through the bed is less than the difference between the pressure at the point of introduction and the pressure at the bottom of the lifting zone. Since the relatively dry flue gas discharges from the lowermost zone at a pressure at least a small amount above the desired pressure in the lifting zone, it may accordingly be advantageously employed for elevating or lifting the catalyst. Thus, contact of the catalyst with substantial concentrations of steam during elevation may be avoided if desired while usefully employing the energy of a selected portion of the flue gas in lifting the catalyst. Furthermore, hydration of the catalyst may be postponed to a point in the system where the effect of such hydration can be utilized to the greatest advantage.

The principles involved in the present invention are set forth in detail below in connection with the description of the drawings in which various preferred embodiments of the present invention are shown in a schematic manner. Although the present invention includes within its scope a variety of processes as set forth herein, the drawings will be explained in terms of a catalytic hydrocarbon cracking process, since those skilled in the art will understand thereby how to operate analogous or equivalent processes by the same principles.

In the drawings:

Figures 1 and 2 are schematic representations of the major parts of systems embodying the present invention with parts broken away to reveal the internal construction of some of the vessels.

As illustrated in Figures 1 and 2, relatively large particles of solid cracking catalyst, such as particles between about 1 to 15 and preferably about 2 to 6 millimeters in diameter, flow downwardly through a converter vessel or reactor indicated generally at 10 as a downwardly moving non-turbulent bed, and are transferred by conduit 11 to a regenerator vessel or kiln indicated generally at 12 in which the coke deposited on the catalyst particles in the cracking zone is removed. Compositions effective as hydrocarbon conversion and/or cracking catalysts (typically natural or synthetic aluminosilicates) and the conditions in reactor 10 and kiln 12 are well known to the art and need not be repeated here.

Catalyst particles are withdrawn from regenerator 12 and flow downwardly in conduit 13 as a compact non-turbulent column to a gas lift inlet chamber at the bottom of a gas lift, this chamber being indicated generally at 14, and are transported, lifted or elevated vertically upward as a continuous stream of solid particles by a transporting, elevating or lifting gas introduced to the gas lift by conduits 15 and 16, the particles of catalyst passing upwardly through an elongated vertical cylindrical passageway or conduit 17 to a closed housing, vessel or separator indicated generally at 18 which vessel comprises a disengaging zone. The disengaged lifting gas is removed from vessel 18, as from the top thereof by conduit 21. If desirable, the disengaged gases may then pass to a cyclone separator 22, in which entrained fine particles of catalyst are separated from the lifting gas. Gas, freed of fine particles, is removed from the top of separator 22 by conduit 23; the fine particles are removed from the bottom of cyclone 22 through conduit 24 and pass to a bin (not shown). Solid catalyst particles disengaged from the transporting or lifting gas settle on the surface of bed 19 in vessel 18, from which bed catalyst particles flow to the reactor through conduit 26 as a relatively compact non-turbulent column of particles. It is to be understood that a particular type of separator, such as vessel 18, is not a part of this invention and that separators other than the one illustrated, which perform the function of separating the lifting gas and the particles of catalyst by various specific methods, may be employed.

Hydrocarbon fractions to be cracked or reformed, ranging from naphthas to heavy residual stocks, are introduced from a feed preparation zone of a type known to the art in vapor, liquid or mixed phase conditions to reactor 10, such as through conduit 27, and contacted by the catalyst particles therein, using known methods and apparatus. The hydrocarbons are passed downwardly through the bed of catalyst in reactor 10 in vapor form and under conversion conditions, disengaged from the catalyst particles, removed from the reactor through conduit 28 and thereafter directed to a fractionation zone for appropriate processing to products such as gasoline, fuel oil, recycle stock and the like. As is apparent to those skilled in the art, hydrocarbons may enter reactor 10 through conduit 28, pass upwardly through the bed of catalyst and be removed by conduit 27, suitable adjustments being made in the pressure relationships described below. A purge gas such as steam, inert flue gas and the like may be introduced to reactor 10 by conduit 29 to purge the catalyst particles of volatile hydrocarbons.

In order to keep separate the gases in reactor 10 and kiln 12, a sealing gas, such as steam, inert flue gases, carbon dioxide or other gases compatible with both the cracking reaction in reactor 10 and the combustion reaction in kiln 12, is introduced to conduit 11 by conduit 31. A similar provision for introducing sealing gas to conduit 26 may be provided, as by conduit 32. Where reactor 10 and/or kiln 12 are constructed in a known manner so that there is a sealing or catalyst introduction chamber in the top thereof, which chamber provides a vapor space above a bed of catalyst and constitutes a process zone separate from the cracking or regeneration zone, respectively, a sealing gas may be introduced to the chamber instead of the conduits as shown in Figures 1 and 2. It is to be understood that reactor 10 and kiln 12 may be equipped with various other devices known to the art but not shown in the drawings; for example, reactor 10 may contain a device for contacting catalyst particles with liquid oil and kiln 12 may contain cooling coils at appropriate positions.

In accordance with the invention and as shown in Figures 1 and 2, the regeneration is effected in a series of vertically superimposed adjacent regeneration zones through which the coked catalyst flows successively by introducing in each zone a stream of fresh oxygen containing gas, such as air or air fortified with oxygen. Although any number of such zones may be used, it is preferred to use two of such zones as shown in Figures 1 and 2. The zones may be separated from each other by any of various means known to the art and may even, within the scope of the invention, be in separate vessels with a seal leg or legs between the vessels. It is, however, preferred to have the zones in a single vessel as shown and to have the catalyst pass therethrough in continuous non-turbulent flow. As will be described more fully below, the flow of gases through the various zones in a desired manner is effected by proper control of the pressure relationship of the various entering and exit gases.

In the embodiment shown in Figure 1, oxygen containing gas is introduced to said series of regeneration zones at least one level intermediate the top and bottom of said series of regeneration zones, as by conduit 33, at a pressure substantially greater than the gaseous pressure at the bottom of the gas lift (i. e., in vessel 14). Gas introduced by conduit 33 enters manifold or closed channel 34 and is distributed evenly over the surface of the bed by channels 35, which are in gaseous communication with manifold 34. Channels 35 are open at the bottom and extend regularly and uniformly over substantially the full extent of the bed in a direction normal to manifold 34. A portion of the gas so introduced passes upwardly as a stream through the uppermost regeneration zone, contacts the coked catalyst under combustion conditions and discharges from kiln 12 through conduit 36, any known gas disengaging device (not shown) being used at the top of the bed for the separation of the flue gas thus formed from the catalyst particles. It has been found that combustion under such conditions produces a relatively wet flue gas (i. e., one generally containing about 10 percent or more of steam) because the coke deposit contains a substantial amount of hydrogen which is preferentially burned in the early stages of combustion and because the major portion of any water physically absorbed on the catalyst will be desorbed under these conditions.

The remainder of the oxygen containing gas introduced through conduit 33 passes downwardly through the lowermost regeneration zone as a stream separate and apart from the stream in the uppermost zone and contacts the catalyst under conditions such that the remainder of the coke deposited thereon in the reaction zone is burned. Under the conditions in the lowermost regeneration zone, a relatively dry flue gas is produced. (A relatively dry flue gas is defined for the purposes of this invention as having less than about 5 weight percent of water vapor therein, such as 3 percent or less, including water vapor originally in the fresh oxygen containing gas, such as the atmospheric water vapor in air or water vapor resulting from the combustion of fuel burned in a stream of air to heat the air.) Such relatively dry flue gas is collected, as by a gas collecting device, typically troughs 35 and channel 34 (not shown), and discharges from kiln 12 through conduit 37 at a pressure greater, by at least a small amount, than that at the bottom of the gas lift, and thereafter passes, at least predominantly, to conduits 15 and 16 for use as lift gas, as described below.

Although the present invention is not limited to the use of such a device, a desirable device for introducing catalyst particles and lift gas to lift pipe 17 is shown in Figures 1 and 2. Conduit 13 discharges catalyst particles so that they form a compact bed in vessel 14, as shown. Positioned within vessel 14 and within the horizontal extent of the compact bed of catalyst particles is a cylinder 38, which cylinder is open at both ends, substantially greater in diameter than lift pipe 17, and spaced and positioned, as by supports 39, with its top above the compact bed of catalyst particles so that catalyst particles do not enter the annulus formed between cylinder 38 and lift pipe 17 and the bottom completely immersed in the bed of catalyst. The bottom of cylinder 38 may be substantially at the same level as the bottom of lift pipe 17 or may be placed slightly higher or lower depending upon the concentration of catalyst particles desired in the stream of catalyst particles and lifting gas in lift pipe 17, or may even be made adjustable instead of fixed as shown in Figures 1 and 2.

The relatively dry flue gas from the lowermost regeneration zone may be split into two streams and a small portion passed through conduit 16 and a larger portion passed through conduit 15 by adjusting valves 41 and 42, respectively. The portion of gas in conduit 16 moves directly vertically upward into lift pipe 17 while substantially all or most of the gas introduced by conduit 15 passes downwardly through the open annulus between cylinder 38 and lift pipe 17 to the bottom of this annulus and then reverses direction and enters lift pipe 17, sweeping catalyst particles upwardly with it as it enters the lift pipe.

A system such as that illustrated in Figures 1 and 2 affords means for effecting a number of alternative operations any one of which may be employed depending upon various conditions in the system. For example, the pressure drop relations in the system may be such that the discharge pressure of the relatively dry flue gas from the lowermost of the regeneration zones is appreciably higher; such as from 1.0 to 3.0 pounds per square inch, than that desired at the bottom of gas lift 17 in order to accommodate a pressure drop of from under one to several pounds per square inch through flow and/or pressure control instruments in the line to the lifting zone. Alternatively, the discharge pressure of the flue gas may be from several tenths to one pound greater than the pressure desired at the bottom of the lift and thus provide only for the pressure drop in the conduit to the lifting zone. When the amount of relatively dry flue gas exceeds the requirements of the gas lift, excess flue gas may be discharged through conduit 43, this discharge being controlled by valve 44 which is set to produce a desired pressure at the bottom of the gas lift. By this mode of operation, the effect of small variations in the flow of the flue gases on the pressure at the bottom of the gas lift is avoided, since such variations are taken care of by variations in the gas discharged through conduit 43.

In an alternative operation, all of the relatively dry flue gas is passed through conduit 15, valve 41 being closed and valve 42 being open. If desired, lifting may be effected solely by the gas entering conduit 15, thus establishing a given rate of circulation and/or concentration of catalyst particles in lift pipe 17. Should it be desired to increase the rate of circulation in lift pipe 17 without disturbing the flow of gas through conduit 15 (thus tending to maintain constant conditions in the lowermost regeneration zone), additional gas for lifting may be introduced by conduit 45, in an amount adjusted, as by valve 46, so as to produce the desired increase in circulation rate. The amount of such gas introduced is only a relatively minor portion of the total gas utilized for lifting, such as below ten percent, and is preferably of such a nature that the total lifting gas is still relatively dry, (i. e., is below 3 to 5 weight percent total water vapor content). Suitable gases are air, flue gas and the like.

As will be appreciated from the above description, the use of the relatively dry flue gas from the lowermost zone in the manner shown in Figure 1 has many advantages. Since the pressure in the lowermost regeneration zone may be only slightly greater than that at the bottom of the gas lift, only a short seal leg between the regeneration zone and the bottom of the gas lift is needed under such a condition and hence conduit 13, which serves, in Figure 1, principally as a run down or catalyst transferral conduit only, may be as short as is consistent with the geometry of the equipment.

In the embodiment shown in Figure 1, conduit 33 (together with the associated manifold 34 and troughs 35) may be positioned at a level between conduits 36 and 37 so as to produce equal or different pressure drops in the separate streams of gas passing through the uppermost and lowermost zones, respectively. Alternatively, or in conjunction with the selection of a particular level for the introduction of the oxygen containing gas, the pressure drop produced in either or both the uppermost and lowermost zones can be controlled by varying the amount of gas passing through these zones, as by placing a pressure control valve or valves in the exit lines 36 and 37, respectively. Generally, in the case of unequal pressure drop, it is preferred to have the lesser pressure drop in the lowermost zone, since such a disposition of the pressure drops is more efficient and economical in that the entering pressure of the oxygen containing gas is lower for the same exit pressure (or same pressure at the bottom of the gas lift), thereby saving the cost of pumping to the higher pressure.

A typical example of the pressures employed in a commercial sized plant, in accordance with the embodiment illustrated in Figure 1 (and using concurrent flow in the reactor) is given in the following table in which pressures at the points indicated in Figure 1 are given.

TABLE I

Static pressures at the points indicated, lbs. per sq. in. gauge

| A-1 | B-1 | C-1 | D-1 | E-1 | F-1 | G-1 | H-1 | I-1 | J-1 | K-1 |
|---|---|---|---|---|---|---|---|---|---|---|
| 0.4 | 11.9 | 11.7 | 6.0 | 6.4 | 6.5 | 7.0 | 6.8 | 8.5 | 6.8 | 6.0 |

In the embodiment illustrated in Figure 2, oxygen containing gas is introduced to the bottom of the lowermost regeneration zone, as by conduit 47, at a pressure substantially greater than that at the bottom of the gas lift (conduit 13 being of sufficient length to operate as an effective seal leg), passed upwardly through the lowermost zone and removed through troughs 35, manifold 34 and conduit 48. A separate stream of oxygen containing gas is introduced to the bottom of the upper zone through conduit 49 at a pressure controlled by valve 51 to be substantially equal, or only slightly greater, such as 0.1 to 0.2 pound per square inch, than the discharge pressure of the flue gas in conduit 48. The oxygen containing gas introduced by conduit 49 passes upwardly through the uppermost zone counter-current to the downward flow of catalyst and is removed through conduit 52. The conditions in, and operation of, these zones are similar to that discussed in connection with Figure 1.

A typical example of the pressures employed in a commercial sized plant, in accordance with the embodiment illustrated in Figure 2, is given in the following table in which pressures at the points indicated in Figure 2 are given.

TABLE II

Static pressures at the points indicated, lbs. per sq. in. gauge

| A-2 | B-2 | C-2 | D-2 | E-2 | F-2 | G-2 | H-2 | I-2 | J-2 | K-2 |
|---|---|---|---|---|---|---|---|---|---|---|
| 0.5 | 7.6 | 7.4 | 6.0 | 6.2 | 4.7 | 4.7 | 6.1 | 6.0 | 6.8 | 4.5 |

The gas lift described herein has been found to operate at a high efficiency and an economically low rate of particle attrition when maximum average velocity of travel of the catalyst particles is advantageously above about 10 and below about 60 feet per second, and preferably between about 20 to 40 feet per second. (The average velocity is the velocity of all of the particles averaged over the horizontal cross sectional area of the lift pipe; the maximum velocity is the velocity after final acceleration, the particles generally emerging from the top of the lift at the maximum velocity.) Such lifts are advantageously operated at between about 1 to 7 and generally below about 20 pounds per square foot of cross sectional area per foot of lift height (when using catalyst particles having about 40 to 55 pounds per cubic foot apparent density). Thus a lift of 200 feet will have above 1 to about 10 pounds per square inch total pressure drop across the ends thereof.

In one phase of the invention, when catalyst particles capable of hydration are employed, advantage is taken of the fact that such catalyst particles leave the lowermost regeneration zone in a dehydrated condition and are elevated in substantially the same condition due to the use of a relatively dry lifting gas by subsequently hydrating the catalyst, with an attendant rise in temperature because of exothermic heat of hydration, at a selected point in the downflow path before, or at, the time the catalyst particles contact hydrocarbons. Such catalyst particles, typically comprising montmorillonite, such as particles of natural or chemically treated bentonitic clays, may be hydrated by contacting them with saturating amounts of steam in separator 18 or in a catalyst introduction or sealing chamber in the top of reactor 10. Such an operation is particularly effective when high boiling hydrocarbons containing substantial amounts of sulfur, such as 1.0 weight percent or greater, are cracked to form gasoline in reactor 10, due to the protection against the deleterious effects of the sulfurous gases on the catalyst by the absorbed water vapor. Other advantages, such as a lower temperature in the gas lift and lower thermal losses, are gained by the above procedure.

Obviously many modifications and variations of the invention as hereinbefore set forth may be made without departing from the spirit and scope thereof and therefore only such limitations should be imposed as are indicated in the appended claims.

I claim as my invention:

1. In a hydrocarbon conversion system in which solid particulate hydrocarbon conversion catalyst continuously circulates through a system wherein freshly regenerated catalyst contacts hydrocarbons under conversion conditions in a hydrocarbon conversion zone and thereby concomitantly accumulates a deposit of coke; wherein coked catalyst from the conversion zone contacts oxygen containing gas under combustion conditions in a series of vertically superimposed adjacent regeneration zones in compact non-turbulent bed form so as to remove at least a portion of said coke; and wherein catalyst is elevated upwardly in at least one lifting zone by a lifting gas for subsequent flow downwardly through other zones in the system: the improvement which comprises introducing oxygen containing gas as separate streams to the uppermost and to the lowermost of said series of regeneration zones, at least the stream of oxygen containing gas introduced to the lowermost regeneration zone being at a pressure substantially above the pressure at the bottom of said lifting zone; passing oxygen containing gas through the bed of catalyst in the uppermost zone; discharging relatively wet flue gas from said uppermost zone; passing oxygen containing gas through the bed of catalyst in the lowermost zone under flow conditions such that the consequent pressure drop is not more than the difference between the pressure of said oxygen containing gas at the point of introduction and the pressure at the bottom of said lifting zone; discharging relatively dry flue gas from said lowermost zone; and elevating catalyst through said lifting zone by lifting gas predominantly comprising at least a part of said relatively dry flue gas.

2. The improvement of claim 1 in which the gas employed as lifting gas contains less than about 5 volume percent of steam.

3. The improvement of claim 1 characterized in that the catalyst is discharged from the lowermost regeneration zone and is elevated through the lifting zone in a relatively dry condition and is saturated with steam after discharge from the lifting zone immediately prior to contact with hydrocarbons in the conversion zone.

4. In a hydrocarbon conversion system in which solid particulate hydrocarbon conversion catalyst continuously circulates through a system wherein freshly regenerated catalyst contacts hydrocarbons under conversion conditions in a hydrocarbon conversion zone and thereby concomitantly accumulates a deposit of coke; wherein coked catalyst from the conversion zone contacts oxygen containing gas under combustion conditions in two vertically superimposed adjacent regeneration zones in compact non-turbulent bed form so as to remove at least a portion of said coke; and wherein catalyst is elevated upwardly in at least one lifting zone by a lifting gas for subsequent flow downwardly through other zones in the system: the improvement which comprises introducing oxygen containing gas to a level between the uppermost and the lowermost of said regeneration zones, the pressure of said oxygen containing gas at the point of introduction being substantially above the pressure at the bottom of said lifting zone; passing a portion of said oxygen containing gas upwardly through the bed of catalyst in the uppermost zone and the remainder downwardly through the bed of catalyst in the lowermost zone under flow conditions such that the consequent pressure drop is not more than the difference between the pressure of said oxygen containing gas at the point of introduction and the pressure at the bottom of said lifting zone; discharging relatively wet flue gas from the top of said uppermost zone; discharging relatively dry flue gas from the bottom of said lowermost zone; and elevating catalyst through said lifting zone by said relatively dry flue gas.

5. In a hydrocarbon conversion system in which solid particulate hydrocarbon conversion catalyst continuously circulates through a system wherein freshly regenerated catalyst contacts hydrocarbons under conversion conditions in a hydrocarbon conversion zone and thereby concomitantly accumulates a deposit of coke; wherein coked catalyst from the conversion zone contacts oxygen containing gas under combustion conditions in two vertically superimposed adjacent regeneration zones in compact non-turbulent bed form so as to remove at least a portion of said coke; and wherein catalyst is elevated upwardly in at least one lifting zone by a lifting gas for subsequent flow downwardly through other zones in the system: the improvement which comprises introducing a stream of oxygen containing gas to the bottom of the lowermost of said two regeneration zones, the pressure of said stream being substantially greater than the gaseous pressure at the bottom of said lifting zone; passing said oxygen containing gas through the bed of catalyst in said lowermost zone under flow conditions such that the consequent pressure drop is not more than the difference between the pressure of said oxygen containing gas at the point of introduction and the pressure at the bottom of said lifting zone; discharging relatively dry flue gas from the top of the lower of said two regeneration zones; introducing a second stream of oxygen containing gas to the bottom of the upper of said two regenerating zones, the pressure of said second stream being substantially equal to the pressure at which said relatively dry flue gas is discharged from the top of said lowermost zone; passing said oxygen containing gas through the bed of catalyst in said uppermost zone; discharging relatively wet flue gas from the top of said uppermost zone; and elevating catalyst through said lifting zone by said relatively dry flue gas.

6. In a hydrocarbon conversion system in which solid particulate hydrocarbon conversion catalyst continuously circulates through a system wherein freshly regenerated catalyst contacts hydrocarbons under conversion conditions in a hydrocarbon conversion zone and thereby concomitantly accumulates a deposit of coke; wherein coked catalyst from the conversion zone contacts oxygen containing gas under combustion conditions in a series of vertically superimposed adjacent regeneration zones in compact non-turbulent bed form so as to remove at least a portion of said coke; and wherein catalyst is elevated upwardly in at least one lifting zone by a lifting gas for subsequent flow downwardly through other zones in the system; the improvement which comprises introducing oxygen containing gas to said series of regeneration zones; flowing said oxygen containing gas as separate streams through the uppermost and the lowermost of said series of regeneration zones; said oxygen containing gas being introduced at least into said lowermost regeneration zone at a pressure substantially above the pressure at the bottom of said lifting zone and being flowed through said lowermost regeneration zone under conditions such that the consequent pressure drop is no more than the difference between the pressure of said oxygen containing gas at the point of introduction and the pressure at the bottom of said lifting zone; maintaining the lowermost of said zones at a higher temperature than the uppermost of said zones; discharging relatively wet flue gas from said uppermost zone; discharging hot relatively dry flue gas from said lowermost zone, and employing said hot relatively dry flue gas as at least a major part of said lifting gas without intermediate cooling of said flue gas.

DAVID B. ARDERN.

REFERENCES CITED

The following references are of record in the file of this patent:

UNITED STATES PATENTS

| Number | Name | Date |
|---|---|---|
| 2,351,214 | Kaufmann et al. | June 13, 1944 |
| 2,411,996 | Kassel | Dec. 3, 1946 |
| 2,414,373 | Gerhold | Jan. 14, 1947 |
| 2,440,475 | Jacomini | Apr. 27, 1948 |
| 2,458,359 | Evans | Jan. 4, 1949 |
| 2,458,487 | Crowley, Jr. | Jan. 4, 1949 |
| 2,471,398 | Simpson et al. | May 24, 1949 |